United States Patent
Burkhalter, Jr. et al.

[15] 3,669,148
[45] June 13, 1972

[54] BYPASS VALVE FOR FLUID TREATING ASSEMBLY

[72] Inventors: Robert Burkhalter, Jr., Fort Atkinson, Wis.; Don Edward Heskett, Villa Park; Frank Kryder Hoover, Evanston, both of Ill.

[73] Assignee: Morton-Norwich Products, Inc., Chicago, Ill.

[22] Filed: Nov. 24, 1969

[21] Appl. No.: 879,378

[52] U.S. Cl. ..................137/625.29, 285/133, 285/191
[51] Int. Cl. ....................................................F16k 11/02
[58] Field of Search ..................137/625.29, 625.32, 625.31, 137/625.47, 625.46, 625.43, 625.41; 285/123, 130, 132, 133, 191

[56] References Cited

UNITED STATES PATENTS

| | | |
|---|---|---|
| 853,364 | 5/1907 | Honeywell..................137/625.29 |
| 1,677,148 | 7/1928 | Rosner..................137/625.29 X |
| 2,385,510 | 9/1945 | Harwood..................251/306 |
| 2,414,966 | 1/1947 | Melichar..................137/625.43 |
| 2,703,586 | 3/1955 | Asker..................251/306 X |
| 3,191,628 | 6/1965 | Kirkwood et al. ..................137/625.43 |
| 1,806,450 | 5/1931 | Ercanbrack..................285/191 X |
| 3,489,178 | 1/1970 | Kice..................137/625.41 |

FOREIGN PATENTS OR APPLICATIONS

| | | |
|---|---|---|
| 882,024 | 5/1953 | Germany..................137/625.43 |

*Primary Examiner*—Henry T. Klinksiek
*Attorney*—Pendleton, Neuman, Williams & Anderson

[57] ABSTRACT

In a bypass valve adapted to selectively bypass a fluid treating assembly while a fluid treating element is removed and replaced, a single operating member controls the bypass function, simultaneously isolating the fluid treating assembly. The bypass valve housing has concentric inlet and outlet ports, and is connected to the fluid treating assembly with a single bolt, coaxial with the ports. The operating member permits mounting of a control knob on either of two opposite sides of the valve housing. The valve mechanism incorporates a single gasket for sealing between the edges of three spaced valve vanes and an interior surface of the valve.

11 Claims, 5 Drawing Figures

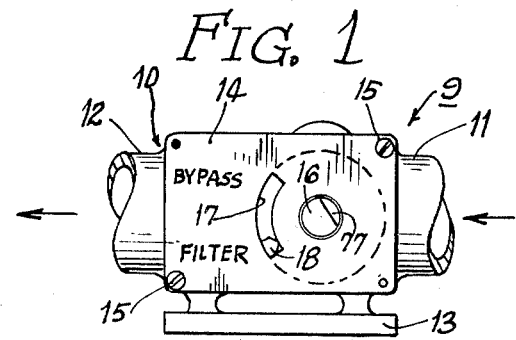
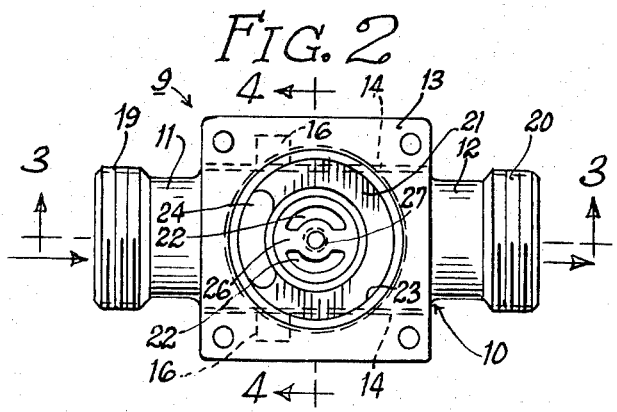
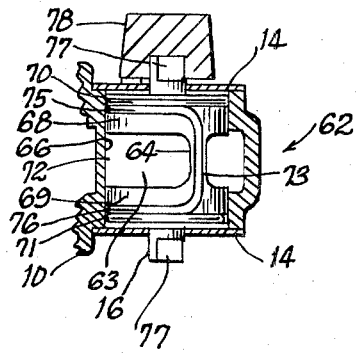
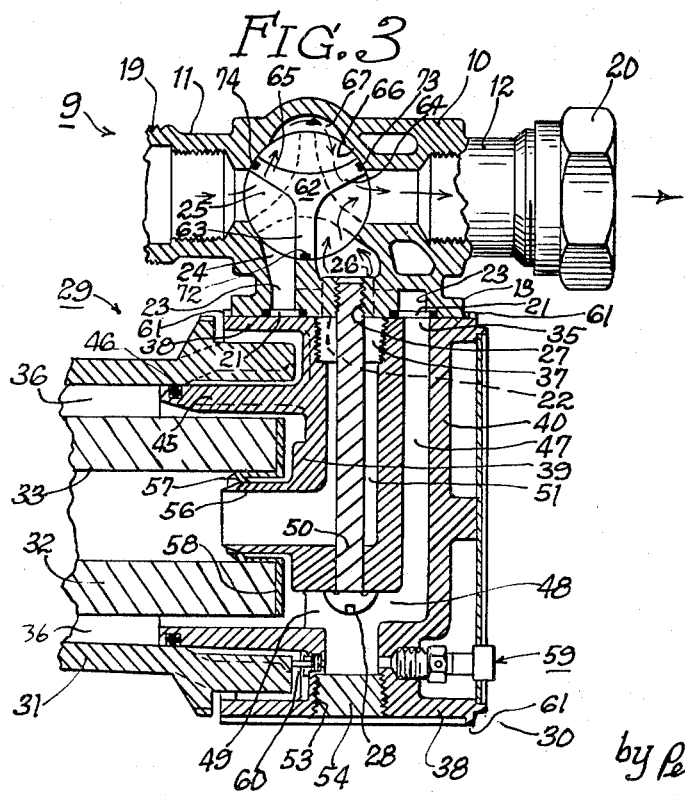
PATENTED JUN 13 1972
3,669,148
INVENTORS
Robert Burkhalter, Jr.
Frank Kryder Hoover
Don Edward Heskett
by Pendleton, Neuman, Seibold
and Williams Attys

BYPASS VALVE FOR FLUID TREATING ASSEMBLY

BACKGROUND OF THE INVENTION

The present invention relates to bypass valve apparatus, and particularly to such apparatus which is employed with a fluid treating assembly employing a replaceable fluid treating element. Through the use of the bypass valve, service is not interrupted while the element is removed and replaced.

It has been customary to place stop valves in the pipes connected with the inlet and outlet of the fluid treating assembly, so that the assembly is isolated from both input and output lines by closing the stop valves, when the element is to be replaced. It is desirable to accomplish this isolation, and to bypass the fluid treating assembly, with the operation of a single valve operating member.

As the preferred attitude of the fluid treating assembly is generally fixed, it is desirable that a number of possible orientations be permitted between the body of the valve and the assembly, to facilitate connection of the valve apparatus to the supply pipe and the exit pipe, irrespective of their orientation. It is also desirable to make provision for a control knob for operating the bypass valve on either of two opposite sides of the valve body.

SUMMARY OF THE INVENTION

Accordingly, it is a principal object of the present invention to provide a bypass valve for connection with a fluid treating assembly, said valve serving to bypass fluid around the assembly and isolate the assembly by the operation of a single valve operating member.

Another object of the present invention is to provide such a valve in which a variety of possible orientations is permitted between the fluid treating assembly and the valve body, so that the assembly may be maintained in its preferred attitude, and to provide convenient connection to the inlet and outlet pipes.

A further object of the present invention is to provide such a valve operated by a control knob, which may be disposed on either of two opposite sides of the valve body.

Another object of the present invention is to provide such a valve in which the passageways through the valve body are opened and closed by means of a movable valve operating member having a plurality of vanes, each vane having independent sealing means formed as part of a single gasket.

These and other objects of the present invention will become manifest upon an examination of the following description and the accompanying drawings.

In one embodiment of the present invention, there is provided a bypass valve apparatus for cooperating with a fluid treating assembly, the valve apparatus having a body with a primary inlet port, and a primary outlet port coaxial therewith, a valve operating member rotatable about an axis transverse to the axis of said primary inlet and outlet ports and having a plurality of vanes to define a first flow path directly between said primary inlet port and said primary outlet port when said valve member is in a first position and a second path between said primary inlet port and said primary outlet port through said fluid treating assembly when said valve member is in a second position, said second flow path interconnecting with said fluid treating assembly through a secondary outlet port and a coaxial secondary inlet port, the axis of said secondary inlet and outlet ports being normal to the axis of said primary inlet and outlet ports.

Reference will now be made to the accompanying drawings in which:

FIG. 1 is an elevation of an exemplary embodiment of the present invention, as seen from the side, top or bottom of the device, depending on its orientation;

FIG. 2 is a side elevation of the apparatus illustrated in FIG. 1;

FIG. 3 is a vertical cross sectional view of the apparatus, taken along the section line 3—3 in FIG. 2, showing a filter assembly attached to the apparatus;

FIG. 4 is a partial vertical cross sectional view of the apparatus, taken along the section line 4—4 in FIG. 2; and FIG. 5 is a side elevation of a portion of the apparatus shown in FIG. 4.

Referring now to the drawings, FIG. 1 shows a side elevation of a bypass valve apparatus 9, incorporating the present invention. The embodiment illustrated in the drawings is adapted for use with apparatus to filter and otherwise treat water, but may equally well be applied to a variety of treatments to a variety of fluids. A valve body 10 has an inlet pipe 11 and an outlet pipe 12 coaxial with the inlet pipe 11 on the opposite side of the body 10. One side of the body 10 has a flange 13, parallel to the axis of the pipes 11 and 12, by which the body 10 is connected to the fluid treating or filter assembly with which it cooperates. The body 10 is open on two opposite sides adjacent the side on which the flange 13 is connected, and the open sides are covered by side walls 14, secured to the body 10 by screws 15. A shaft 16 (supporting a valve operating member 62) passes through the body 10 and is mounted in aligned apertures in the side walls 14. The axis of the shaft 16 is orthogonal with the axis of the pipes 11 and 12 and a line parallel to the plane of the flange 13. The shaft 16 controls the valve operating member during operation of the valve. The rotation of the shaft 16 is limited to 60° by means of an arcuate slot 17 in one of the side walls 14. A stud 18, which is connected indirectly to the shaft 16 internally of the body 10, projects outwardly through the slot 17 and the extreme ends of the slot 17 limit movement of the stud 18.

The inlet pipe 11 is preferably connected to a coupling member 19 (FIG. 2) and the outlet pipe 12 is connected to a similar coupling member 20. By means of the coupling members 19 and 20, the body 10 is connected to a supply pipe, by which water is supplied to the valve apparatus 9, and an exit pipe, which conducts water away from the valve apparatus 9. The ports through which the water passes into and out of the valve apparatus 9 are the primary inlet and outlet ports of the valve apparatus. The body 10 is preferably rigidly connected to the supply pipe and the exit pipe, so that these pipes support the weight of the valve apparatus 9, and also that of the filter assembly 29 (FIG. 3).

FIG. 2 shows the secondary or filter outlet port 21 and the secondary or filter inlet port 22, concentrically arranged on the flange 13. The filter outlet port 21 is connected to the inlet of the filter apparatus within the filter assembly 29, and the filter inlet port 22 is connected to the outlet of the same filter apparatus. During normal operation of the valve apparatus 9, water from the inlet pipe 11 flows through the body 10 and out through the filter outlet port 21, and through the filter assembly 29. Filtered water returns to the body 10 through the filter inlet port 22, and then flows through the outlet pipe 12.

The filter outlet port 21 is a circular groove 23 (FIGS. 2 and 3) provided in the face of the flange 13. A passageway 24 communicates with the groove 23 and leads into an interior chamber 25 within the body 10.

The filter inlet port 22 is centrally located within the circular groove 23 and coaxial therewith. A support member of bridge 26 extends across the port 22 and divides it into two equal parts, as shown in FIG. 2. A threaded bore 27 is centrally located in the bridge 26, and is coaxial with the ports 21 and 22. A bolt 28, having a threaded end, is threadably received in the bore 27, and connects the valve body 10 with the filter assembly 29, shown connected to the valve body 10 in FIG. 3.

The filter assembly 29 has a stationary part 30 and a removable bowl 31, the latter supporting a replaceable filter element or cartridge 32. The filter element 32 is formed in the shape of a circular cylinder having a central coaxial bore 33, and is adapted to filter water by having it pass through the element from the exterior thereof into the bore 33. The inlet port 35 of the assembly 29, which communicates with the filter outlet port 21 of the valve apparatus 9, is connected to the space 36 within the bowl 31 and exterior to the filter element 32, and the interior bore 33 of the filter element is connected to the outlet port 37 of the assembly, by connections which will be described. The outlet port 37 of the filter assembly 29 communicates with the filter inlet port 22 of the valve apparatus 9.

The stationary part 30 is rigidly connected to the valve apparatus 9 by the bolt 28 so that the entire filter assembly 29 is supported and held rigid by the pipes connected to the valve apparatus 9. The stationary part 30 is preferably molded in one integral unit and is composed of a suitable plastic material. The bowl 31 is also preferably formed of molded plastic. The stationary part 30 incorporates four side walls 38, two of which are shown in FIG. 3, arranged generally in the form of a cylinder having a generally rectangular cross section, with rounded corners. A horizontal wall 39 interconnects the side walls 38 at about their middle. The horizontal wall 39 has a centrally located raised portion 40 which incorporates various fluid passageways, which will be described.

The bowl 31 is removably secured to the stationary part 30 by flanges (not shown) connected to the stationary part 30 which cooperate with corresponding lugs (not shown) on the bowl 31.

Centrally located within the stationary part 30, and depending from the wall 39, is a tubular projection 45. The tube 45 is circular in cross section and is sized so that at its lower portion it narrowly fits within the upper portion of the bowl 31. A seal 46 is disposed in an annular groove on the outside surface of the tube 45, near its extremity, and operates to create a fluid seal between the tube 45 and the bowl 31.

A passageway 47 leads from the inlet port 35 to a chamber 48 molded within the raised portion 40 of the stationary part 30. An aperture 49 leads from the chamber 48 through the wall 39 of the stationary part 30 and communicates with the space 36 between the filter element 32 and the bowl 31. A bore 50, coaxial with the outlet port 37, receives the bolt 28 to connect the filter assembly to the valve apparatus. A passageway 53, also formed within the raised portion 40, leads from the chamber 48 through the wall 38, but this is plugged with a plug 54. The passageway 53 is opened by removing the plug 54, when the filter assembly 29 is to be used separately from the valve apparatus 9, and in that event, two other plugs are employed to close the bore 50, and the passageway 47 at chamber 48, respectively.

A second tube 56, coaxial with the tube 45, and centrally located within it, projects outwardly from the wall 39 and communicates with the interior bore 33 of the filter element 32. The other end of the tube 56 communicates with a passageway 51, which leads to the outlet port 37 of the filter assembly 29. A seal 57, molded as part of an end cap 58 secured to the upper end of the filter element 32, is provided to form a seal between the tube 56 and the bore 33 within the filter element 32. The only flow path available for the water is from the space 36, through the filter element 32, into the interior bore 33, and thence out through the tube 56, the passageway 51 and the outlet port 37.

The filter assembly 29 is provided with a vent valve 59, for relieving the pressure within the bowl 31 prior to removal of the filter element 32. Another valve 60 is provided to indicate when the parts of the filter assembly 29 are in correctly assembled relationship.

Although the filter assembly 29 is depicted in FIG. 3 with the bowl 31 and the filter element 32 in a horizontal position, so as to be consistent with FIGS. 1 and 2, the preferred attitude of the filter assembly 29 is vertical. Only when it is in the vertical position can the filter element 32 be removed and replaced without an accompanying discharge of water from within the stationary part 30.

The coaxial relationship of the ports 21 and 22 and the bore 27, permit adjustment in the orientation of the filter assembly 29, in relationship to the valve body 10, for the filter assembly 29 may be rotated about the axis of the bolt 28 without affecting the connection of the filter inlet port or the filter outlet port. A U-shaped rim 61, secured to the outer surface of the walls 38, forms three sides of a square to receive the flange 13 and prevent the body 10 from rotating after the bolt 28 is secured.

The valve operating member 62, which is mounted on the shaft 16, has three vanes, 63, 64, and 65, equally spaced 120° apart. Each of the vanes cooperates with a circular cylindrical surface 66 of an aperture extending through the body 10, to form a water tight seal between the opposite sides of each vane. When the valve operating member is in the position illustrated in FIG. 3, water may flow through the inlet pipe 11 into the chamber 25 defined by the surface 66, but is limited to the section of the chamber 25 between the vanes 63 and 65, which section communicates with the filter outlet port 21. The filter inlet port 22 communicates with the section of the chamber 25 between the vanes 63 and 64, which section leads to the outlet pipe 12.

When the valve operating member 62 is rotated 60° to the position shown in phantom in FIG. 3, two of the three vanes 63, 64 and 65 remain in contact with the cylindrical surface 66, but the third vane, which extends upwardly, moves out of contact with this surface. A chamber 67 is provided with the body 10 adjacent one side of the chamber 25, to permit water to flow through the chamber 67, around the vane. The chamber 67 occupies a position midway between the side walls 14, but does not extend outwardly as far as the sides of the body 10, so that the ends of the chamber 25 are circular on each side of the body 10, and are sealed by O-rings 70 and 71, as described hereinafter. Assuming the valve element to have been rotated 60° clockwise, as viewed in FIG. 1, (counterclockwise as viewed in FIG. 3), the vane 65 seals the primary inlet pipe 11 from the filter outlet port 21. Similarly, the vane 63 seals the filter inlet port 22 from the outlet pipe 12. The vane 64 extends upwardly into the chamber 67. The ports 21 and 22 are completely isolated from the water flowing through the pipes 11 and 12, permitting the filter element 32 to be removed and replaced without discharging any water from the inlet pipe 11, and without any interruption in water service.

Referring now to FIGS. 4 and 5, a side view of the valve operating member 62 is illustrated. The vanes 63, 64 and 65 are joined at their ends by a first end wall 68 and a second end wall 69, each of which are circular and fit closely within the circular cylindrical surface 66. An O-ring 70 is disposed in an annular groove in the cylindrical surface of the end wall 68, and a similar O-ring 71 is disposed in an annular groove in the cylindrical surface of the end wall 69. The O-rings 70 and 71 seal off the ends of the chamber 25, and confine the sections of the chamber 25 between adjacent pairs of the vanes.

The vanes 63, 64 and 65 are provided with vane seals in the form of lengths of resilient sealing or gasket material disposed in grooves provided in the end of the vanes where they are adjacent the surface 66. The vane 63 has a vane seal 72, and the vanes 64 and 65 have vane seals 73 and 74, respectively. The vane seals 72, 73 and 74 are all formed of a single piece of gasket material, interconnected at one end by a link 75 of gasket material, and at the other end by a link 76, such that the composite of the vane seals 72, 73 and 74 and the links 75 and 76 resembles a window frame. Grooves are provided in the periphery of the end walls 68 and 69, as well as in the ends of the vanes, so that the vane seals and their connecting links remain substantially flush with the exterior surface of the valve operating member 62. In FIG. 4, the vane 63 is illustrated as being in engagement with the surface 66, with the vane seal 72 furnishing the seal between these parts. In FIG. 5, the valve operating member 62 has been rotated 90° to provide an end view of the vane 63.

The shaft 16 projects slightly beyond the side walls 14, and both ends of the shaft 16 are provided with a flat surface 77 to accept a control knob 78 (FIGS. 4 and 5) for turning the shaft. The knob 78 may be located on either side of the valve apparatus.

What is claimed is:

1. A bypass valve for cooperating with a fluid treating assembly, by which fluid from a supply pipe is treated and made available to an exit pipe, the bypass valve comprising a body, said body having a primary inlet port connectable to said supply pipe and a primary outlet port connectable with said exit pipe, said primary outlet port being coaxial with said primary inlet port, a valve operating member rotatable about an axis transverse to the axis of said inlet and outlet ports, said valve operating member having a plurality of vanes to define a first flow path directly between said primary inlet port and said primary outlet port when said valve operating member is in a first position and a second flow path between said primary inlet port and said primary outlet port through said fluid treating assembly when said valve operating member is in a second position, a flange connected to said body having secondary inlet and outlet ports, one of said secondary ports comprising an annular groove in said flange and the other of said secondary ports comprising a circular bore centrally disposed in said flange within said groove, said second flow path interconnecting with said fluid treating assembly through said secondary outlet port and said secondary inlet port, the axis of said secondary inlet and outlet ports being perpendicular to the axis of said primary inlet and outlet ports.

2. Apparatus according to claim 1, wherein the axis of said valve operating member is orthogonal with the axis of said primary inlet and outlet ports and with the axis of said secondary inlet and outlet ports.

3. Apparatus according to claim 1 wherein said fluid treating assembly comprises a stationary part and a removable bowl for supporting a removable fluid treating element, a first passageway connecting said secondary outlet port to one side of said secondary element, a second passageway connecting the other side of said fluid treating element to secondary inlet port, said bowl being removable from said stationary part about a line transverse to the axis of said secondary inlet and outlet ports.

4. Apparatus according to claim 1, wherein said body has a circular cylindrical surface and said valve operating member has a plurality of radial vanes projecting outwardly from the axis of rotation of said valve operating member, said vanes cooperating with said circular cylindrical surface to define said first and second flow paths.

5. Apparatus according to claim 4, wherein said valve operating member has first and second circular cylindrical end walls interconnecting the ends of said vanes, each of said vanes having a groove disposed in the surface thereof adapted to cooperate with said cylindrical surface, and each of said end walls having second grooves in the cylindrical surfaces of said end walls and joining with the grooves in said vanes, and a gasket having a vane seal for each of said vanes disposed in the grooves in said vanes, and connecting links interconnecting said vane seals disposed in said second grooves.

6. Apparatus according to claim 1 including a threaded bore coaxial with said secondary inlet and outlet ports, said threaded bore adapted to receive a single bolt for interconnecting said body and said fluid treating assembly, whereby said valve may be rotated relative to said assembly about the axis of said bolt.

7. Apparatus according to claim 1, wherein said valve operating member is mounted for rotation on a shaft, said shaft extending outwardly beyond two opposite sides of said body.

8. Apparatus according to claim 1, wherein said groove forms said secondary outlet port and said central bore forms said secondary inlet port.

9. A bypass valve for cooperating with a fluid treating assembly, by which fluid from a supply pipe is treated and made available to an exit pipe, the bypass valve comprising a body, said body having a primary inlet port connectable to said supply pipe and a primary outlet port connectable with said exit pipe, said primary outlet port being coaxial with said primary inlet port, a valve operating member rotatable about an axis transverse to the axis of said inlet and outlet ports, said valve operating member having a plurality of vanes to define a first flow path directly between said primary inlet port and said primary outlet port when said valve operating member is in a first position and a second flow path between said primary inlet port and said primary outlet port through said fluid treating assembly when said valve operating member is in a second position, said second flow path interconnecting with said fluid treating assembly through a secondary outlet port and a secondary inlet port, said secondary inlet port being coaxial with said secondary outlet port with the axis of said secondary inlet and outlet ports being perpendicular to the axis of said primary inlet and outlet ports, said body having a circular cylindrical surface and said valve operating member having a plurality of radial vanes projecting outwardly from the axis of rotation of said first valve operating member, said vanes cooperating with said circular cylindrical surface to define said first and second flow paths, a first of said vanes separating said secondary outlet port from said secondary inlet port when said valve operating member is in said second position, a second of said vanes isolating said primary inlet port from said first flow path when said valve operating member is in said second position, and a third of said vanes isolating said primary outlet port from said first flow path when said valve operating member is in said second position.

10. Apparatus according to claim 9, wherein said first vane separates said secondary inlet and outlet ports from said primary outlet port and said second vane separates said secondary inlet and outlet ports from said primary inlet ports when said valve operating member is in its first position.

11. Apparatus according to claim 9, wherein said body has a chamber communicating with said circular cylindrical surface and adapted to interconnect the opposite sides of said third vane when said valve operating member is in its first position.

* * * * *